United States Patent Office 3,156,636
Patented Nov. 10, 1964

3,156,636
HALOGENATION OF IRRADIATED POLYMERS
Joseph Silverman, Hicksville, N.Y., assignor to W. R. Grace & Co., Cambridge, Mass., a corporation of Connecticut
No Drawing. Filed Dec. 2, 1959, Ser. No. 856,661
6 Claims. (Cl. 204—154)

This invention relates to the halogenation of polyethylene and polypropylene.

It is an object of the present invention to accelerate the halogenation of polyethylene and polypropylene.

Another object is to reduce the gas and vapor transmission of irradiated polyethylene and polypropylene.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by halogenating irradiated polyethylene or polypropylene. The irradiated polyethylene or polypropylene is prepared by irradiating it with high energy ionizing radiation having an energy equivalent to from 20,000 to 20,000,000 volts and to a dosage of from $2 \times 10^6$ rad up to $200 \times 10^6$ rad. Preferably, the irradiation is to the extent of between $6 \times 10^6$ and $20 \times 10^6$ rad, although irradiation to the extent of $50 \times 10^6$ rad, $75 \times 10^6$ rad and $100 \times 10^6$ rad also gives good results. The irradiation of the polyethylene or polypropylene can be accomplished in known fashion using a Van de Graaff 2,000,000 volt generator or a 1,000,000 volt of 2,000,000 volt General Electric resonant transformer. Irradiation can be carried out with electrons or with $\beta$-rays, e.g., by employing thallium 204, krypton 85, promethium 147 or strontium 90. Gamma-rays can be used with cesium 137 or cobalt 60 as the irradiation source. Other methods of irradiation can also be used as shown in Rainer Patent 2,877,500 and Miller Patent 2,897,092.

The halogenation can be accomplished by using fluorine, chlorine or bromine in the liquid or gaseous condition. Normally, halogenation is accomplished at room temperature, although higher and lower temperatures can be employed. Similarly, the halogenation is usually carried out at atmospheric pressure or at subatmospheric or superatmospheric pressure. The halogen can be used alone or it can be diluted with up to 90% of a relatively inert gas such as argon, nitrogen or the like.

The irradiated polyethylene or polypropylene can be in the form of film, tubing, containers, e.g., bottles, or in any other form. The halogenation can be on either or both surfaces of the film and can be on the inside or outside of tubing, bottles, and similar objects or can be on both the inside and outside of tubing, bottles and the like.

The halogenation of the irradiated polyethylene and polypropylene renders the irradiated polyethylene or polypropylene substantially impermeable to gases and aromatic flavors to which the irradiated polyethylene or polypropylene is normally permeable. Thus, the halogenation provides a barrier against transmission of carbon dioxide, oxygen, nitrogen, the Freons, perfume essences, oils, e.g., citrus oil, etc.

The halogenated irradiated polyethylene or polypropylene can be used as a squeeze bottle or other package to store perfume, vegetable oils, e.g., cottonseed oil, as an aerosol dispenser, etc. Similarly, it can be used in the form of a bag or overwrap to package foodstuffs, e.g., poultry, such as turkeys and the like, cheese, pickles, frozen vegetables, red meats, hams, bacon, fresh vegetables, dried fruits, fresh fruits, potatoes, etc.

The irradiated polyethylene or polypropylene can be in the form of biaxially oriented film, tubing, bags, etc. in which case it can be shrunk by application of heat to make a tight package. The stretching can be done to an extent of 100 to 900% (usually 100 to 600%) laterally and 100 to 700% (usually 100 to 600%) longitudinally. The irradiated biaxially oriented polyethylene or polypropylene has a shrink energy at 96° C. of at least 100 p.s.i. in each direction and in some instances the shrink energy is as high as 1000 p.s.i.

In the examples below the polyethylene employed was Alathon 14, a high pressure branched chain polyethylene having a melt index of 1.8 and an average molecular weight of about 20,000. However, other polyethylenes can be employed having molecular weights from 7,000 or lower to 60,000 or even higher. The polyethylene can be of high, medium or low density and can be made by either high or low pressure technique. The polypropylene can be any of those commercially available such as Hoechst polypropylene and Hercules polypropylene.

It has been found that when halogenation, preferably chlorination, is carried out on irradiated polyethylene or polypropylene that the halogenation occurs much more rapidly than does halogenation of unirradiated polyethylene or polypropylene.

The halogenation can be carried out to an extent of from 0.01% to 85% or more based on the weight of the polyethylene or polypropylene.

With fluorine the halogenation is preferably to an extent of 0.03 to 3.5% by weight of the irradiated polymer. With chlorine the halogenation preferably is allowed to proceed to an extent of 1 to 25% and with bromine to an extent of 2 to 50% by weight of the irradiated polymer.

The irradiated polyethylene or polypropylene can have a thickness of from 0.25 to 250 mils.

While the halogenation is usually carried out with the free elements, other halogenating agents, e.g., monochlorine trifluoride, etc., can be employed.

Example 1

Alathon 14 film 1.5 mils thick which had been pre-irradiated to the extent of $20 \times 10^6$ rad of a gamma dose using $Co_{60}$ as the irradiation source and at the rate of 340,000 rad/hour was coiled into a loose spiral and exposed to flowing chlorine gas at room temperature. As is evident from the following table, the rate of chlorine pickup was far greater than that of unirradiated polyethylene subjected to the chlorine gas under identical conditions.

| Irradiation | Chlorination Time (min.) | Percent Weight Gain |
|---|---|---|
| 0 | 1.0 | 1.7 |
| $20 \times 10^6$ rad | 1.0 | 8.2 |
| 0 | 7.5 | 3.5 |
| $20 \times 10^6$ rad | 7.5 | 17.4 |
| 0 | 12.5 | 4.5 |
| $20 \times 10^6$ rad | 15.0 | 23 |

Example 2

Polyethylene film, 2 mil thick, was irradiated with electrons to the extent of $8 \times 10^6$ rad using a General Electric 2 mev. resonant transformer type electron beam generator. Chlorine gas was then passed over the irradiated film at room temperature until there was a weight gain of 10%.

Example 3

Example 2 was repeated replacing the chlorine by fluorine and continuing the passage of gas until there was a weight gain of 0.05%. When packages were made from the fluorinated irradiated polyethylene there was a noticeable improvement in the resistance to permeation by oxygen, carbon dioxide and other gases. The fluorination also was much more rapid than a similar fluorination of the same polyethylene film which had not been irradiated.

Example 4

Example 2 was repeated except the polyethylene tubing 18 mil thick was employed and was biaxially oriented subsequent to irradiation and the irradiation dosage was $12 \times 10^6$ rad. The irradiated film prior to chlorination had the following properties, transverse stretch 4.6 to 1, longitudinal stretch 3.9 to 1, thickness 1 mil, tensile strength 21° C. 9,000 p.s.i. (longitudinal) and 13,000 p.s.i. (transverse), shrink energy at 96° C. 400 p.s.i. (transverse) and 275 p.s.i. (longitudinal) shrink at 96° C. 40% longitudinal and 50% transverse.

Example 5

Example 2 was repeated using Hoechst polypropylene film of 2 mil thickness in place of the Alathon 14 and it was observed that the chlorination proceeded more rapidly than when unirradiated polypropylene was used.

What is claimed is:

1. A process comprising halogenating an irradiated polymer of an olefin having 2 to 3 carbon atoms, said irradiation having been to an extent of at least $2 \times 10^6$ rad with high energy ionizing irradiation, said halogen having an atomic weight up to 80 said halogenation being continued until at least 0.01% of halogen is present in the polymer.

2. A process according to claim 1 wherein the irradiated polymer is irradiated polyethylene.

3. A process according to claim 1 wherein the halogenating agent is chlorine.

4. A process according to claim 3 wherein the irradiated polymer is irradiated polyethylene.

5. A process comprising halogenating an irradiated, biaxially oriented polymer of an olefin having 2 to 3 carbon atoms, said irradiation having been to an extent of at least $2 \times 10^6$ rad with high energy ionizing irradiation, said halogen having an atomic weight up to 80 said halogenation being continued until at least 0.01% of halogen is present in the polymer.

6. A process according to claim 5 wherein the irradiated polymer is irradiated polyethylene and the halogenating agent is chlorine.

References Cited by the Examiner

UNITED STATES PATENTS

| | | | |
|---|---|---|---|
| 2,183,556 | 12/39 | Fawcett | 204—154 |
| 2,715,075 | 8/55 | Wolinski | 204—154 |
| 2,981,668 | 4/61 | Brasch | 204—154 |
| 2,982,706 | 5/61 | Lemiszka et al. | 204—154 |

FOREIGN PATENTS 835,781  5/60  Great Britain.

OTHER REFERENCES

Stefanesco et al.: Proceedings of the Second United Nations International Conference on the Peaceful Uses of Atomic Energy, volume 29 (1958), pages 254–257.

Martin: Chemical and Engineering News, vol. 33 April 4, 1955, pages 1424–28.

MURRAY TILLMAN, *Primary Examiner.*

J. REBOLD, J. R. SPECK, *Examiners.*